(12) United States Patent
Lu

(10) Patent No.: US 9,037,325 B2
(45) Date of Patent: May 19, 2015

(54) METHOD AND A DEVICE FOR OPERATING AN ELECTRICALLY DRIVEN MOTOR VEHICLE

(75) Inventor: Yan Lu, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 789 days.

(21) Appl. No.: 13/215,875

(22) Filed: Aug. 23, 2011

(65) Prior Publication Data

US 2012/0053772 A1    Mar. 1, 2012

(30) Foreign Application Priority Data

Aug. 24, 2010  (DE) .......................... 10 2010 039 675

(51) Int. Cl.
  *B60W 20/00*    (2006.01)
  *B60L 15/20*    (2006.01)
  (Continued)

(52) U.S. Cl.
  CPC ............ *B60L 15/2045* (2013.01); *B60L 11/02* (2013.01); *B60L 11/123* (2013.01); *B60L 2260/00* (2013.01); *B60L 2260/52* (2013.01);
  (Continued)

(58) Field of Classification Search
  CPC .......... B60W 20/104; B60W 20/1082; B60W 20/50; B60W 10/06; B60W 50/082; Y02T 10/6217; B60L 11/123
  USPC ................. 701/22; 180/65.21, 65.265, 65.28, 180/65.31
  See application file for complete search history.

(56) References Cited

U.S. PATENT DOCUMENTS 5,426,589 A    6/1995 Kitagawa et al.
5,487,002 A *  1/1996 Diller et al. ...................... 701/1
(Continued)

FOREIGN PATENT DOCUMENTS

CN       101678779 A       3/2010
DE   10 2005 005 002 A1    8/2006
(Continued)

OTHER PUBLICATIONS

German Search Report dated Mar. 4, 2011 with partial English translation (nine (9) pages).
(Continued)

*Primary Examiner* — Thomas G Black
*Assistant Examiner* — Peter D Nolan
(74) *Attorney, Agent, or Firm* — Crowell & Moring LLP

(57) ABSTRACT

A method and a device are provided for operating an electrically driven motor vehicle with a battery-fed electric drive motor and a generator-coupled internal combustion engine for providing electric energy for the battery. An internal combustion engine is operated based on the state of charge of the battery. In the method, a route to a previously entered destination is determined by way of a navigation system, and it is checked periodically, based on the particular route, a detected charge level of the battery and a detected energy consumption, whether the destination will be reached or whether there is a range gap to the destination. When a range gap is determined, it is determined, whether the destination can be reached in at least one specified energy saving operating mode, in which the energy consumption is reduced, or whether the destination will be reached only in REX operating mode. The driver is sent a corresponding recommendation. If no decision is made by the driver, then the REX operating mode is activated as soon as it is determined that this mode is necessary to bridge the range gap.

12 Claims, 1 Drawing Sheet

(51) Int. Cl.
*B60L 11/02* (2006.01)
*B60L 11/12* (2006.01)
*B60L 1/00* (2006.01)
*B60L 1/02* (2006.01)
*B60L 11/18* (2006.01)

(52) U.S. Cl.
CPC .......... *Y02T10/7005* (2013.01); *Y02T 10/7077* (2013.01); *Y02T 90/161* (2013.01); *B60L 11/126* (2013.01); *Y02T 10/6217* (2013.01); *B60L 1/003* (2013.01); *B60L 1/02* (2013.01); *B60L 11/1861* (2013.01); *B60L 2240/34* (2013.01); *B60L 2240/421* (2013.01); *B60L 2240/622* (2013.01); *B60L 2240/662* (2013.01); *B60L 2260/54* (2013.01); *Y02T 10/7044* (2013.01); *Y02T 10/705* (2013.01); *Y02T 90/16* (2013.01); *Y02T 90/162* (2013.01); *Y02T 10/642* (2013.01)

(56) References Cited

U.S. PATENT DOCUMENTS

| | | | |
|---|---|---|---|
| 5,778,326 A | 7/1998 | Moroto et al. | |
| 5,786,640 A | 7/1998 | Sakai et al. | |
| 5,815,824 A * | 9/1998 | Saga et al. | 701/22 |
| 6,697,717 B2 * | 2/2004 | Shioda et al. | 701/22 |
| 7,669,676 B2 * | 3/2010 | Miller | 180/65.265 |
| 7,671,567 B2 * | 3/2010 | Eberhard et al. | 320/150 |
| 7,715,958 B2 | 5/2010 | Kumar | |
| 8,346,419 B2 * | 1/2013 | Kelty et al. | 701/22 |
| 8,376,904 B2 * | 2/2013 | Eisele | 477/3 |
| 8,565,952 B2 * | 10/2013 | Mehr et al. | 701/22 |
| 2004/0084232 A1 | 5/2004 | Obayashi | |
| 2010/0145562 A1 * | 6/2010 | Moran | 701/22 |
| 2010/0211242 A1 | 8/2010 | Kelty et al. | |
| 2010/0299010 A1 * | 11/2010 | Balmy | 701/22 |
| 2011/0153141 A1 * | 6/2011 | Beechie et al. | 701/29 |
| 2012/0035795 A1 * | 2/2012 | Yu et al. | 701/22 |
| 2012/0143410 A1 * | 6/2012 | Gallagher et al. | 701/22 |

FOREIGN PATENT DOCUMENTS

| | | |
|---|---|---|
| DE | 10 2008 059 199 A1 | 6/2010 |
| EP | 1 842 757 A1 | 10/2007 |
| EP | 2 091 127 A1 | 8/2009 |
| JP | 8-126116 A | 5/1996 |
| JP | 8-289407 A | 11/1996 |
| JP | 2000-188802 A | 7/2000 |
| JP | 2003-111208 A | 4/2003 |

OTHER PUBLICATIONS

Chinese Office Action dated Aug. 22, 2014, with English translation (Fifteen (15) pages).

* cited by examiner

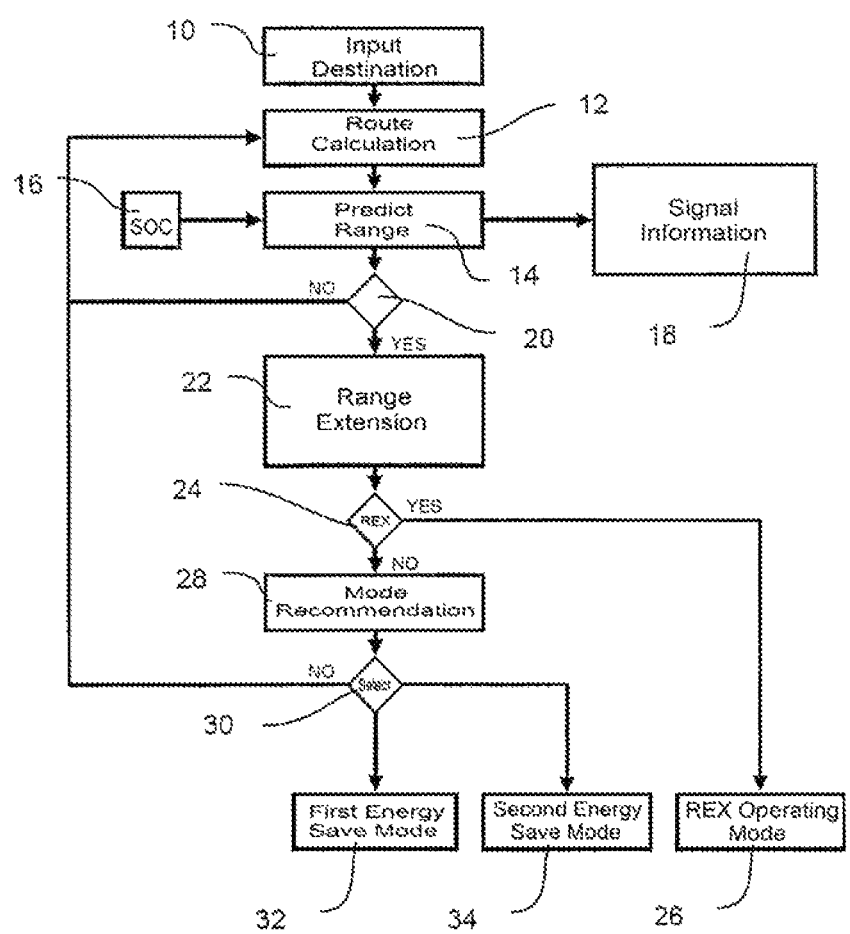

METHOD AND A DEVICE FOR OPERATING AN ELECTRICALLY DRIVEN MOTOR VEHICLE

CROSS-REFERENCE TO RELATED APPLICATION

This application claims priority under 35 U.S.C. §119 from German Patent Application No. DE 10 2010 039 675.3, filed Aug. 24, 2010, the entire disclosure of which is herein expressly incorporated by reference.

BACKGROUND AND SUMMARY OF THE INVENTION

The invention relates to a method for operating an electrically driven motor vehicle with a battery-fed electric drive motor and a generator-coupled internal combustion engine for providing electric energy for the electric drive motor or, more specifically, the battery. In this case the internal combustion engine is operated (REX operating mode) based on the state of charge of the battery. Furthermore, the invention relates to a device for carrying out such a method.

Such a method is known from DE 10 2008 059 199 A1, which describes an electric vehicle that has a so-called range extender and that is driven exclusively by an electric machine. Furthermore, there is a low-power internal combustion engine with a coupled generator for recharging the battery.

The cruising range of battery operated electric vehicles creates a general feeling of uneasiness among users, because unlike fuel-driven vehicles, where it is possible to extend any cruising range by refueling with minimal effort and time and with a broad range of availability, the high voltage battery of electric vehicles can be charged only in a few places. In addition, the charging process requires considerably more time than the refueling of a motor vehicle with an internal combustion engine. This feeling of uneasiness may be intensified, for example, especially if the battery is not totally charged at the start of the trip or if longer distances have to be covered.

JP 08126116 A and JP 2000188802 A disclose a method that is intended for operating hybrid vehicles comprising electric motors and internal combustion engines and that controls the charging of the battery on the basis of navigation data.

Furthermore, it is known from the prior art to provide, in particular, energy saving operating modes that are intended for hybrid and electric vehicles and that reduce the consumption of energy in order to increase in this way the cruising range of the vehicle. Hence, it is possible to limit or totally suppress the operation of large electric power consumers, like air conditioning and heating systems, for the purpose of saving energy. Furthermore, a maximum speed limiter or an output power limiter of the electric drive motor can be activated.

To date the driver has selected these energy saving operating modes manually.

The object of the invention is to provide a method of the above-mentioned type that makes it possible for the driver of the electric vehicle to reach his destination with minimum inconvenience and without having to worry at the start of his trip about whether the destination can be reached.

The method according to the invention ensures that a driver will not be surprised that the entered destination will not be reached. Rather, the driver can start after entering the destination, provided that the system has not already determined at the start of the trip that even in total REX mode the destination cannot be reached. If the method according to the invention has made sure that the destination will be reached, the driver can start "contented." Should it be determined during the processing, in particular periodic processing, of the inventive method at a later time that at this point the destination can no longer be reached—possibly due to large energy consumers, like air conditioning systems, having been activated in the interim or due to fast or more specifically sporty driving—without restricting the electric power consumers and, thus, a switch to an energy saving operating mode is recommended, then the driver may or may not comply with this recommendation. If the driver follows the recommendation, then the selected energy saving operating mode is implemented, and the destination will be reachable again. If, in contrast, the driver does not follow the recommendation, for example a weaker energy saving operating mode than recommended is selected, then this is implemented, even if this mode will not close the range gap and, thus, the destination would not be reached. The situation is the same, preferably if the driver does not react to the recommendation at all, thus, no change in state. Not until the method according to the invention later determines that the destination cannot be reached without the REX operating mode does the system automatically switch over to the REX operating mode, in which a portion of the energy consumed by the electric motor is provided by the internal combustion engine, with the result that the range is suitably extended.

According to one advantageous further development of the invention, a maximum speed restriction is executed in the at least one energy saving mode. This feature makes it possible to reduce the specific energy demand per route owing to the decrease in air resistance, thus increasing the total cruising distance of the vehicle. As an alternative, a performance restriction can also be executed, a feature that has the advantage of being able to drive at a higher speed in the event of a tail wind or when driving downhill.

According to yet another advantageous further development of the invention, the energy consumption of an air conditioning system and/or an electric heating device is restricted in the at least one energy saving operating mode.

According to yet another advantageous further development of the invention, two or more energy saving operating modes with graduated energy saving adjustments are provided. Preferably, in a first energy saving operating mode having a smaller energy saving, the energy consumption of large consumers, like an air conditioning system, is limited and in a second energy saving operating mode is totally suppressed. It is also contemplated to let the driver gradually adjust the degree of energy restriction.

According to one advantageous further development of the invention, it is checked when determining the range gap (dRW) during REX mode, whether the recommended route runs through an environmental protection zone, in which the REX mode is inadmissible, and this is taken into consideration in determining the possible range gap (dRW). Thus, the driver does not have to worry about environmental protection zones when he is selecting the route, and/or the navigation system can determine the route accordingly and, in so doing, consider that the REX mode is prohibited in that zone. It is also possible for routes running through environmental protection zones to have the navigation system propose an alternative route that bypasses the environmental protection zones and to check whether this solution extends the range due to the possibility of a continuous REX mode or, more specifically, whether a range gap can be closed.

According to yet another advantageous further development of the invention, the energy saving operating mode is activated when the REX operating mode is activated. Thus, it is possible to increase the range even more.

One advantageous further development of the invention proposes a device that is intended for carrying out the above-described method and that includes a range management unit that can be fed the following data: (a) route data from the navigation system; (b) data about the charge level of the battery; (c) electric power consumer data about the operating state of the electric power consumers; and (d) operating state data of the electric drive motor. The range management unit may provide the following signal outputs: (a) an action recommendation signal; (b) control signals for controlling the operating mode of the electric power consumers; and (c) control signals for actuating the electric drive motor for restricting the maximum speed and/or the power output.

Both the inventive method and the necessary interactions with the driver can be carried out with such a range manager.

According to one advantageous further development of the invention, the range management unit includes an indicating and input unit, which conveys to the driver the range situation, and especially in the case of a range gap, a proposal for activating an energy saving operating mode is transmitted.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a schematic block diagram of an exemplary method according to the invention.

DETAILED DESCRIPTION OF THE DRAWINGS

Referring to the FIGURE, first of all, before starting the trip, the driver enters the destination in an input step 10. Based upon the input destination, in the route calculating step 12, the route is determined taking into consideration the position data of a navigation system. Then, the range prediction step 14 calculates by use of the calculated route, and furthermore by means of the stored energy consumption data and the current energy consumption, whether the destination can be reached without restricting the energy consumption or whether there is a range gap to the destination. The range prediction can, if desired, take into consideration altitude information or additional information such as speed restrictions and the battery state of charge (SOC) determined in a battery state determining step 16. If the route runs through an environmental protection zone, in which it is inadmissible to operate internal combustion engines, and, hence, an REX mode is prohibited, the battery charge reserve (SOC reserve) required for this situation is considered.

Preferably in a signaling step 18 the determined data items are conveyed by visual or other means to the driver. In addition, information about the environmental protection zones and/or more information, like the charge level of a battery that is still available at the destination, may also be conveyed.

If, in the range gap determining step 20, no range gap is determined (that is, presumably the vehicle will reach the destination), then the system returns to the route calculating step 12 and repeats the range prediction in step 14 taking into consideration the current position data and the data about the state of charge of the battery. If, in contrast, the range gap determining step 20 determines a range gap (that is, the destination will not be reached), then the range extension determining step 22 determines whether the destination can be reached if one or more energy saving operating modes are activated, or as an alternative the REX operating mode has to be activated. Then, taking into consideration the stored energy consumption data for the various energy consumers and the current measured energy consumption data, the corresponding calculations are performed for all of the stored energy saving operating modes and/or the REX operating mode. The calculations in the range extension determining step 22 largely correspond to the calculations performed in the range prediction step 14, with the one difference that the calculations are based on various energy consumption restrictions.

Step 24 checks whether the REX operating mode was established in the range extension determining step 22. This would mean that the destination cannot be reached even if the energy saving operating mode with the most stringent energy consumption restrictions is activated, and it is necessary to activate the REX operating mode in order to reach the destination. In this case, the REX operating mode 26 is automatically activated, with the result that the existing low-power internal combustion engine (not illustrated) is powered up. This internal combustion engine drives a generator and with it provides a portion of the energy required by the electric drive motor (not illustrated) or, more specifically, recharges the battery. The activation of the REX operating mode is additionally conveyed to the driver by visual and/or acoustical means.

If, in contrast, only one of the energy saving operating modes, but not the REX operating mode, was determined, according to step 24, to be adequate enough to reach the destination, then the operating mode recommendation step 28 transmits to the driver by visual means and preferably also by acoustical means the respective recommendation for action (for example, to activate a first or second energy saving operating mode).

In the operating mode selection step 30 the driver can select, based on the recommendation, one of the energy saving operating modes 32, 34. Then, this instruction is implemented, and the system switches, according to these instructions, into either a first energy saving operating mode 32 or a second energy saving operating mode 34. If the recommendation for action consists of selecting a second energy saving operating mode 34 that saves more energy, but the driver selects, contrary to the recommendation, a less energy saving first energy saving operating mode 32, which does not completely close the range gap (for example, because the air conditioning system is not to be completely turned off due to extreme outside heat), then this selected operating mode is activated nevertheless.

If, however, the driver makes no decision at all in the operating mode selection step 30, nothing happens. Rather, the system returns to step 12, and the range gap calculation is repeated periodically using the updated position data and the data about the charge level of the battery.

In additional loop runs it is possible to vary the way in which the signaling of a range gap can be conveyed, for example by visual means using different colors or using a variety of different noises or noises of variable loudness.

If the first energy saving operating mode was selected, this mode is then implemented in the energy saving operating mode activation step 32, that is, the commensurate restrictions of the maximum speed, maximum power output, use of the air conditioning systems etc., are performed. The same applies, if the second energy saving operating mode was selected. Then the energy saving operating mode activation step 34 implements the respective more stringent energy saving measures.

It is also possible within the scope of the invention to make it possible for the driver himself to perform the activation independently of the need for the REX operating mode, for example in order to create reserves for subsequent additional trips after reaching the destination. Especially if the driver is signaled that it will be necessary to activate at least one energy saving operating mode, it is also possible, according to an advantageous further development of the invention, for the driver to activate the REX operating mode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electrically driven motor vehicle having a battery-fed electric drive motor and a generator-coupled internal combustion engine for providing electric energy for a battery, the internal combustion engine being operated based on a state of charge of the battery, the method comprising the acts of:
   (a) determining a route to a destination via a navigation system;
   (b) checking whether the destination will be reached or whether there is a range gap to the destination based on the determined route, a detected charge level of the battery, and a detected energy consumption;
   (c) when there is the range gap, determining whether the destination is reachable in at least one defined energy saving operating mode in which energy consumption is decreased or whether the destination is reachable only in a REX operating mode;
   (d) providing a recommendation to a driver to activate the energy saving operating mode or the REX operating mode based on the determination, wherein the internal combustion engine operates in the REX operating mode; and
   (e) automatically activating the REX operating mode if the REX operating mode is determined to be necessary to bridge the range gap when no decision is made by the driver.

2. The method according to claim 1, wherein acts (b)-(d) are performed periodically during route travel.

3. The method according to claim 1, wherein a maximum speed restriction is executed in the at least one energy saving operating mode.

4. The method according to claim 1, wherein a vehicle performance restriction is executed in the at least one energy saving operating mode.

5. The method according to claim 3, wherein a vehicle performance restriction is executed in the at least one energy saving operating mode.

6. The method according to claim 1, wherein during the at least one energy saving operating mode, an electric power consumer is switched-off or operated to a limited extent.

7. The method according to claim 6, wherein the electric power consumer is an air conditioning system or an electric heating system.

8. The method according to claim 1, wherein two or more energy saving operating modes having graduated energy saving adjustments are provided.

9. The method according to claim 1, further comprising the acts of:
   when determining the range gap during the REX operating mode, checking whether the determined route runs through an environmental protection zone in which the REX operating mode is inadmissible, and factoring said check into consideration in determining any potential range gap.

10. The method according to claim 1, wherein an energy saving operating mode is additionally activated when the REX operating mode is activated.

11. A device for operating an electrically driven motor vehicle having a battery-fed electric drive motor and a generator-coupled internal combustion engine for providing electric energy for a battery, the internal combustion engine being operated based on a state of charge of the battery, the device comprising:
   a range management unit operatively configured to receive route data from a navigation system of the vehicle, data about a charge level of the battery, data about operating states of one or more electric power consumers in the vehicle, and data on an operating state of the electric drive motor;
   wherein the range management unit determines whether a destination of the route data will be reached or whether there is a range gap to the destination based on the route data, the data about the charge level of the battery, and a detected energy consumption, such that when the range gap is determined, the range management unit further determines whether the destination is reachable in at least one specified energy saving operating mode or only in a REX operating mode;
   wherein the route management unit is operatively configured to output a recommendation to a driver to activate the energy saving operating mode or the REX operating mode based on the determination;
   wherein the internal combustion engine operates in the REX operating mode; and
   wherein the REX operating mode is automatically activated if the REX operating mode is determined to be necessary to bridge the range gap when no decision is made by the driver.

12. The device according to claim 11, further comprising an indicating and input unit.

* * * * *